US011453054B2

United States Patent
Nakamura et al.

(10) Patent No.: US 11,453,054 B2
(45) Date of Patent: Sep. 27, 2022

(54) METHOD FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Akifumi Nakamura, Osaka (JP); Norio Yoshida, Nara (JP); Noriyasu Nakashima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 695 days.

(21) Appl. No.: 16/463,723

(22) PCT Filed: Nov. 27, 2017

(86) PCT No.: PCT/JP2017/042445
§ 371 (c)(1),
(2) Date: May 23, 2019

(87) PCT Pub. No.: WO2018/097298
PCT Pub. Date: May 31, 2018

(65) Prior Publication Data
US 2019/0375011 A1    Dec. 12, 2019

(30) Foreign Application Priority Data
Nov. 28, 2016 (JP) .............................. JP2016-230305

(51) Int. Cl.
B29C 64/153    (2017.01)
B22F 3/105    (2006.01)
(Continued)

(52) U.S. Cl.
CPC ................ *B22F 3/105* (2013.01); *B22F 3/16* (2013.01); *B28B 1/30* (2013.01); *B29C 64/153* (2017.08); *B29C 64/227* (2017.08); *B33Y 10/00* (2014.12)

(58) Field of Classification Search
CPC ........ B29C 64/245; B23K 9/046; B23K 9/048
See application file for complete search history.

(56) References Cited

U.S. PATENT DOCUMENTS

| 5,233,150 A | 8/1993 | Schneebeli et al. |
| 9,266,288 B2 | 2/2016 | Okamura |

(Continued)

FOREIGN PATENT DOCUMENTS

| JP | 4-336304 A | 11/1992 |
| JP | 2013-194263 A | 9/2013 |

(Continued)

OTHER PUBLICATIONS

International Search Report issued in In PCT/JP2017/042445, dated Feb. 27, 2018.

(Continued)

*Primary Examiner* — Timothy Kennedy
(74) *Attorney, Agent, or Firm* — Greenblum & Bernstein, P.L.C.

(57) ABSTRACT

There is provided a method for manufacturing a three-dimensional shaped object by a continuous formation of a plurality of solidified layers through a light beam irradiation, the three-dimensional shaped object being provided with a hollow portion in an interior of the shaped object. The manufacturing method performs the formation of the solidified layer by irradiating a raw material with a light beam at the time of suppling the raw material, thereby allowing a sintering of the raw material or a melting and subsequent solidification of the raw material. In particular, a solidified (Continued)

foundation portion is provided as a part of the three-dimensional shaped object, the solidified foundation portion being used for a platform for a formation of a subsequent layer provided as the solidified layer. An orientation of the solidified foundation portion is changed prior to the formation of the subsequent solidified layer.

4 Claims, 8 Drawing Sheets

(51) Int. Cl.
*B22F 3/16* (2006.01)
*B33Y 10/00* (2015.01)
*B29C 64/227* (2017.01)
*B28B 1/30* (2006.01)

(56) References Cited

U.S. PATENT DOCUMENTS

| | | | | |
|---|---|---|---|---|
| 2009/0025638 | A1* | 1/2009 | Inoue | B29C 64/165 |
| | | | | 118/712 |
| 2014/0197576 | A1 | 7/2014 | Kraibuhler et al. | |
| 2015/0110912 | A1 | 4/2015 | Okamura | |
| 2017/0120385 | A1 | 5/2017 | Tsuji et al. | |
| 2018/0141159 | A1* | 5/2018 | Niitani | B22F 12/00 |
| 2019/0240903 | A1* | 8/2019 | Isobe | B29C 64/236 |

FOREIGN PATENT DOCUMENTS

| | | |
|---|---|---|
| JP | 2014-516841 A | 7/2014 |
| JP | 2015-77754 A | 4/2015 |
| JP | 2016-2565 A | 1/2016 |
| JP | 2016-141142 A | 8/2016 |
| WO | 2015/194113 A1 | 12/2015 |

OTHER PUBLICATIONS

International Preliminary Report on Patentability received in Patent Application No. PCT/JP2017/042445, dated May 28, 2019.

* cited by examiner

METHOD FOR MANUFACTURING THREE-DIMENSIONAL SHAPED OBJECT

TECHNICAL FIELD

The disclosure relates to a method for manufacturing a three-dimensional shaped object. More particularly, the disclosure relates to a method for manufacturing a three-dimensional shaped object, in which a continuous formation of a plurality of solidified layers is performed through a light beam irradiation.

BACKGROUND OF THE INVENTION

Heretofore, a method for manufacturing a three-dimensional shaped object by a continuous formation of a plurality of solidified layers through a light beam irradiation has been known. For example, there is a "powder bed fusion" and a "LMD (Laser Metal Deposition)" as such method.

The powder bed fusion can produce the three-dimensional shaped object by an alternate repetition of a powder-layer forming and a solidified-layer forming on the basis of the following (i) and (ii):

(i) forming a solidified layer by irradiating a predetermined portion of a powder layer with a light beam, thereby allowing a sintering of the predetermined portion of the powder or a melting and subsequent solidification of the predetermined portion; and (ii) forming another solidified layer by newly forming a powder layer on the formed solidified layer, followed by similarly irradiating the new powder layer with the light beam.

This kind of the manufacturing technology makes it possible to produce the three-dimensional shaped object with its complicated contour shape. The three-dimensional shaped object thus obtained can be used as a metal mold in a case where inorganic powder material (e.g., metal powder material) is used as the powder material. While on the other hand, the three-dimensional shaped object can also be used as various kinds of models or replicas in a case where organic powder material (e.g., resin powder material) is used as the powder material.

Figure 7A:
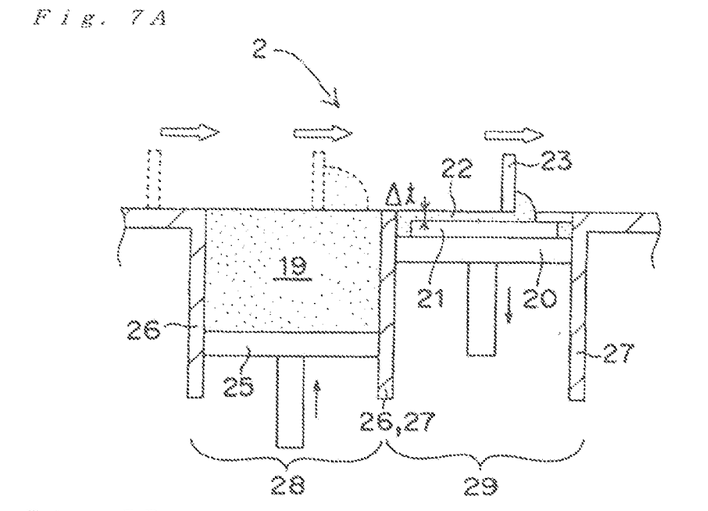
FIGS. 7A-7C are cross-sectional views schematically illustrating a laser-sintering/machining hybrid process for a powder bed fusion.
Figure 7B:
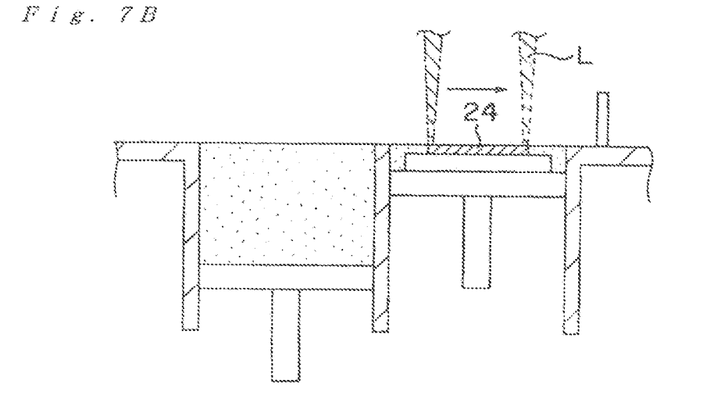
Figure 7C:
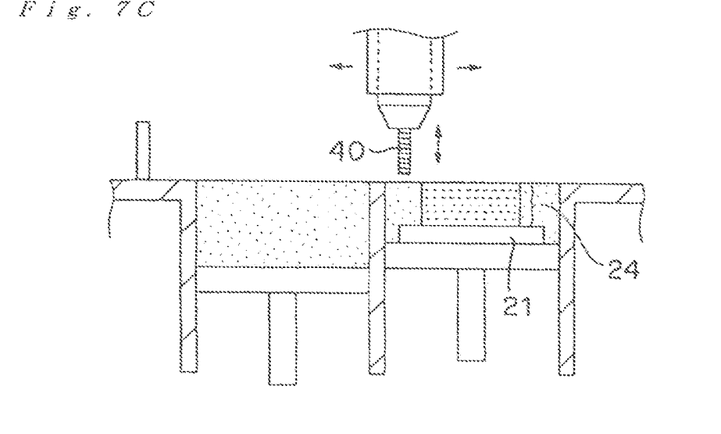

Taking a case as an example wherein the metal powder is used as the powder material, and the three-dimensional shaped object produced therefrom, is used as the metal mold, the powder bed fusion will now be briefly described. As shown in FIGS. 7A-7C, a squeegee blade 23 is forced to move, and thereby a powder layer 22 with its predetermined thickness is formed on the base plate 21 (see FIG. 7A). Then, a predetermined portion of the powder layer 22 is irradiated with a light beam "L" to form a solidified layer 24 therefrom (see FIG. 7B). Another powder layer is newly provided on the solidified layer thus formed, and then is irradiated again with the light beam to form another solidified layer. In this way, the powder-layer forming and the solidified-layer forming are alternately repeated, allowing the solidified layers 24 to be stacked with each other (see FIG. 7C). Such alternate repetition of the powder-layer forming and the solidified-layer forming leads to a production of a three-dimensional shaped object with a plurality of the solidified layers 24 integrally stacked therein. The lowermost solidified layer 24 can be provided in a state of adhering to the surface of the base plate 21. Therefore, there can be obtained an integration of the three-dimensional shaped object and the base plate 21. The integrated "three-dimensional shaped object" and "base plate" can be used as a metal mold as they are.

While on the other hand, the LMD, i.e., Laser Metal Deposition is a method in which the solidified layer is formed by substantially concurrent performances of a supply of a raw material and a light beam irradiation on a base plate. Comparing difference between the powder bed fusion and the LMD, the powder bed fusion has a feature of providing a higher accuracy of form/shape of the solidified layer, while taking a longer time for the formation of the solidified layer. On the other hand, the LMD has a feature of relatively shortening the time required for the formation of the solidified layer in spite of the lower accuracy of form/shape of the solidified layer.

In either case of the LMD or powder bed fusion, a machining step is initiated when the thickness of the stacked solidified layers reaches a predetermined value, which eventually leads to a provision of the desired three-dimensional shaped object which is composed of the stacked solidified layers. The lowermost solidified layer of the three-dimensional shaped object can be obtained in a state of adhering to the surface of the base plate, which means that the three-dimensional shaped object and the base plate have an integrated configuration with each other. The integrated "three-dimensional shaped object" and "base plate" can be used as a metal mold, for example.

PATENT DOCUMENTS (RELATED ART PATENT DOCUMENTS)

PATENT DOCUMENT 1: Japanese Unexamined Patent Application Publication No. 2016-2565

DISCLOSURE OF THE INVENTION

Problems To Be Solved by the Invention

Figure 8:
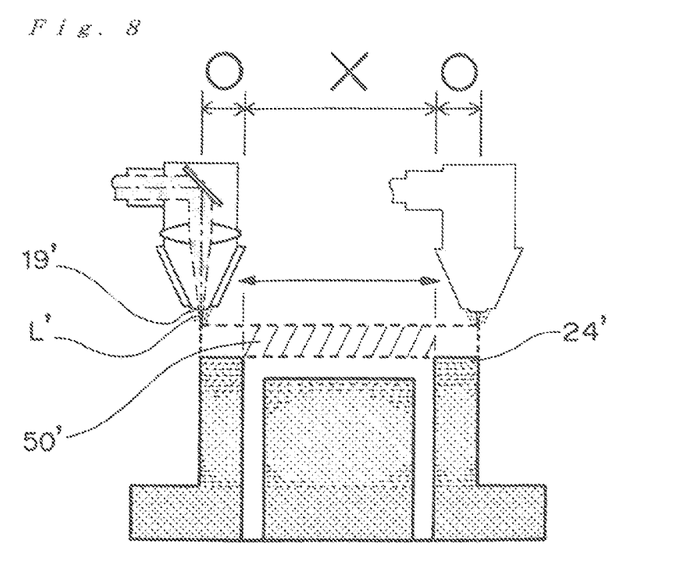
FIG. 8 is a schematic cross-sectional views for explaining a technical problem the inventors of the present application have found.

Regarding the powder bed fusion and the LMD, the inventors of the present application have found that there may be occurred a problem with the latter, i.e., the LMD. That is, the inventors have found that the problem may be occurred in a case where the three-dimensional shaped object having a hollow portion in the interior thereof is manufactured by the LMD. The detailed explanation will be described. A LMD is performed such that the solidified layer is newly formed by substantially concurrent performances of the supply of the raw material 19' and the irradiation of the light beam L', as described above (see FIG. 8). The supply of the raw material 19' and the irradiation of the light beam L' are required to be performed on the already-formed solidified layer(s) 24' serving as a platform, as shown in FIG. 8. In other words, the formation of the new solidified layer through the supply of the raw material 19' and the irradiation of the light beam. L' is physically difficult with a region 50" (see a hatching portion in FIG. 8), i.e., with no platform of the solidified layer 24' provided underneath. With such physically difficult region for the formation of the new layer, the three-dimensional shaped object having the hollow portion in the interior thereof cannot be suitably manufactured.

Under these circumstances, the present invention has been created. That is, an object of the present invention is to provide a manufacturing method of a three-dimensional shaped object, the method being capable of more suitably manufacturing the three-dimensional shaped object having the hollow portion in the interior thereof even in a case where the solidified layer is formed by substantially concurrent. performances of the supply of the raw material and the irradiation of the light beam.

Means for Solving the Problems

In order to achieve the above object, an embodiment of the present invention provides a method for manufacturing a three-dimensional shaped object by a continuous formation of a plurality of solidified layers through a light beam irradiation, the three-dimensional shaped object being provided with a hollow portion in an interior of the shaped object.

wherein the solidified layer is formed by irradiating a raw material with a light beam at the time of suppling the raw material, thereby allowing a sintering of the raw material or a melting and subsequent solidification of the raw material;

wherein a solidified foundation portion is provided as a part of the three-dimensional shaped object, the solidified foundation portion being used for a platform for a formation of a subsequent layer provided, as the solidified layer, and wherein an orientation of the solidified foundation portion is changed prior to the formation of the subsequent solidified layer.

Effect of the Invention

In accordance with an embodiment of the present invention, the three-dimensional shaped object having the hollow portion in the interior thereof can be more suitably manufactured even in a case where the solidified layer is formed by substantially concurrent performances of the supply of the raw material and the irradiation of the light beam.

MODES FOR CARRYING OUT THE INVENTION

The manufacturing method according to an embodiment of the present invention will be described in more detail with reference to the accompanying drawings. It should be noted that configurations/forms and dimensional proportions in the drawings are merely for illustrative purposes, and thus not the same as those of the actual parts or elements.

The term "solidified layer" as used herein substantially means a "sintered layer" in a case where a metal powder for example is used as a raw material, and it substantially means a "cured layer" in a case where a resin powder for example is used as the raw material.

The directions of "upper" and "lower", which are directly or indirectly used herein, are ones based on a stack direction of the solidified layers. The direction in which the solidified layers are stacked upon the manufacturing method of the present invention is "upper", and the opposite direction thereto is "lower". Conveniently, the lower direction can correspond to a vertical lower direction (i.e., direction of gravitational force), and the upper direction can correspond to the opposite direction thereto.

[LMD Method]

Hereinafter, a LMD (i.e., Laser Metal Deposition) used in an embodiment of the present invention will be described. The LMD is a process in which the solidified layer is formed by substantially concurrently supplying of a raw material and irradiating the supplied material with a light beam, for example on a base plate. The LMD has a feature of relatively shortening the time required for the formation of the solidified layer although the accuracy of form/shape of the solidified layer may become lower.

The LMD repeats the formation of the solidified layer so that the thickness of the stacked solidified layers reaches a predetermined value. On reaching the predetermined value of such thickness, a machining step is initiated. Through the machining step, there can be eventually obtained a three-dimensional shaped object composed of the stacked solidified layers, the object having a desired shape. The lowermost solidified layer of the three-dimensional shaped object can be provided in a state of adhering to the base plate, which means that the three-dimensional shaped object and the base plate have an integrated configuration with each other. The integrated "three-dimensional shaped object" and "base plate" can be used as a metal mold, for example.

As a raw material, the LMD process uses a powder and/or a welding material. Namely, the LMD process performs the light beam irradiation at a supply point of raw material where the powder or the welding material is supplied as the raw material, in which case the solidified layer is formed from the powder and/or the welding material. As for the welding material, it does not normally have a form of powder.

The kind of the powder may be the same as that of a powder used for a powder bed fusion. While on the other hand, the welding material is a material for a weld used in the field of a so-called welding technology. The welding material is a fusible material capable of melting upon the irradiation thereof with the light beam. The welding material may be made typically of a metal, but the present invention is not necessarily limited thereto. It is preferred that the welding material may be, but not limited to, in an elongated form such as "form of wire", "form of rod" and the like. The reason for this is that the welding material in the elongated form is easy to be supplied with respect to the supply point of raw material wherein the light beam irradiation is performed.

In a case where the powder is used as the raw material, the light beam Irradiation with respect to the powder during the supplying of the powder is performed to allow the sintering of the powder or the melting and subsequent solidification thereof. This causes the solidified layer to be formed directly from the powder while the powder is supplied. In other words, the powder supply while performing the light beam irradiation causes the solidified layer to be formed from the supplied powder. Preferably, the powder is sprayed onto a focused light beam of the irradiation, and thereby allowing the sintering of the sprayed powder or the melting and subsequent solidification thereof to form the solidified layer.

On the other hand, in a case where the welding material is used as the raw material, the welding material is supplied to reach the focused light beam, and thereby allowing the melted part of the welding material to form the solidified layer. This means that, similarly to the case of the powder, the supply of the welding material while performing the light beam irradiation causes the solidified layer to be formed from the supplied welding material.

[Manufacturing Method of Present Invention]

The inventors of the present application have found that the formation of the new solidified layer through the supply of the raw material 19' and the irradiation of the light beam L' is physically difficult with a region 50' (see a hatching portion in FIG. 8), i.e., with no platform of the solidified layer 24' provided underneath. With such physically difficult region for the formation of the new layer, the three-dimensional shaped object having the hollow portion in the interior thereof cannot be suitably manufactured. In this regard, the inventors of the present application have intensively studied the process to solve such technical problems, which eventually results in a creation of the manufacturing method according to an embodiment of the present invention.

An embodiment of the present invention is characterized by features associated with a forming of the solidified layer in the manufacturing of three-dimensional shaped object having a hollow portion, the forming of the solidified layer being provided through substantially concurrent or simultaneous performances of a raw-material supply and a light-beam irradiation.

Specifically, during the manufacturing of three-dimensional shaped object 100A having the hollow portion 60A according to an embodiment of the present invention, a solidified foundation portion 24Ab is provided as a part of the three-dimensional shaped object 100A, the solidified foundation portion being used for a platform for a formation of a subsequent layer 24Ac provided as the solidified layer. After the solidified foundation portion 24Ab is formed, an orientation thereof is changed. In particular, the orientation of the solidified foundation portion 24Ab is changed prior to the formation of the subsequent solidified layer 24Ac (see FIG. 1 and FIG. 2).

The term "hollow portion" as used herein, in a broad sense, refers to a space portion having no material of the solidified layer. In a narrow sense, the term "hollow portion" as used herein refers to a space portion for passing a temperature-control medium (e.g., cooling medium or heating medium) in a case where the three-dimensional shaped object is used as a metal mold for example. The term "solidified foundation portion" as used herein, in a broad sense, refers to a platform for supporting a solidified layer to be subsequently formed after the formation of such platform. In a narrow sense, the term "solidified foundation portion" as used herein refers to a platform having a stepped form provided on a solidified layer formed prior to the formation of such platform, the platform being for supporting a solidified layer to be subsequently formed after the formation of such platform. The term "subsequent solidified layer" as used herein refers to a solidified layer formed after the formation of the solidified foundation portion. The term "orientation of subsequent solidified layer" as used herein substantially corresponds to an orientation of the stack direction of the solidified layers by which a solidified foundation portion is provided. Moreover, the phrase "orientation of solidified foundation layer is changed" as used herein substantially means that an orientation of the stack direction of the solidified layers constituting the solidified foundation portion is changed such that it becomes different from that provided at the time of forming of the solidified foundation portion.

According to an embodiment of the present invention, the orientation of the solidified foundation portion 24Ab used for a platform for the subsequent solidified layer 24Ac is changed. The changed orientation of the solidified foundation portion 24Ab causes a change in a position of a predetermined region which forms the surface of the solidified foundation portion 24Ab. Such change of the position makes it possible to put a different region of the solidified foundation portion 24Ab into place for supporting the subsequent solidified layer 24Ac, the different region being different from the predetermined region (e.g., "upper surface region") which forms the surface of the solidified foundation portion 24Ab. At a point in time after the orientation of the solidified foundation portion 24Ab is changed, the subsequent solidified layer 24Ac can be formed on the different region of the solidified foundation portion 24Ab (e.g., on the lateral side of the solidified foundation portion 24Ab). The forming of the subsequent solidified layer 24Ac on the different region of the solidified foundation portion 24Ab can provide the following effect. Specifically, even if no platform layer (i.e., no prior solidified layer) for a new solidified layer to be formed is provided underneath, the new solidified layer as the subsequent solidified layer 24Ac can be suitably formed so that the three-dimensional shaped object can have a hollow portion. This means that the physically difficult region for the formation of the new layer can be excluded, and thereby allowing the three-dimensional shaped object 100A having the hollow portion 60A to be suitably manufactured (see FIG. 1 and FIG. 2).

Figure 1:
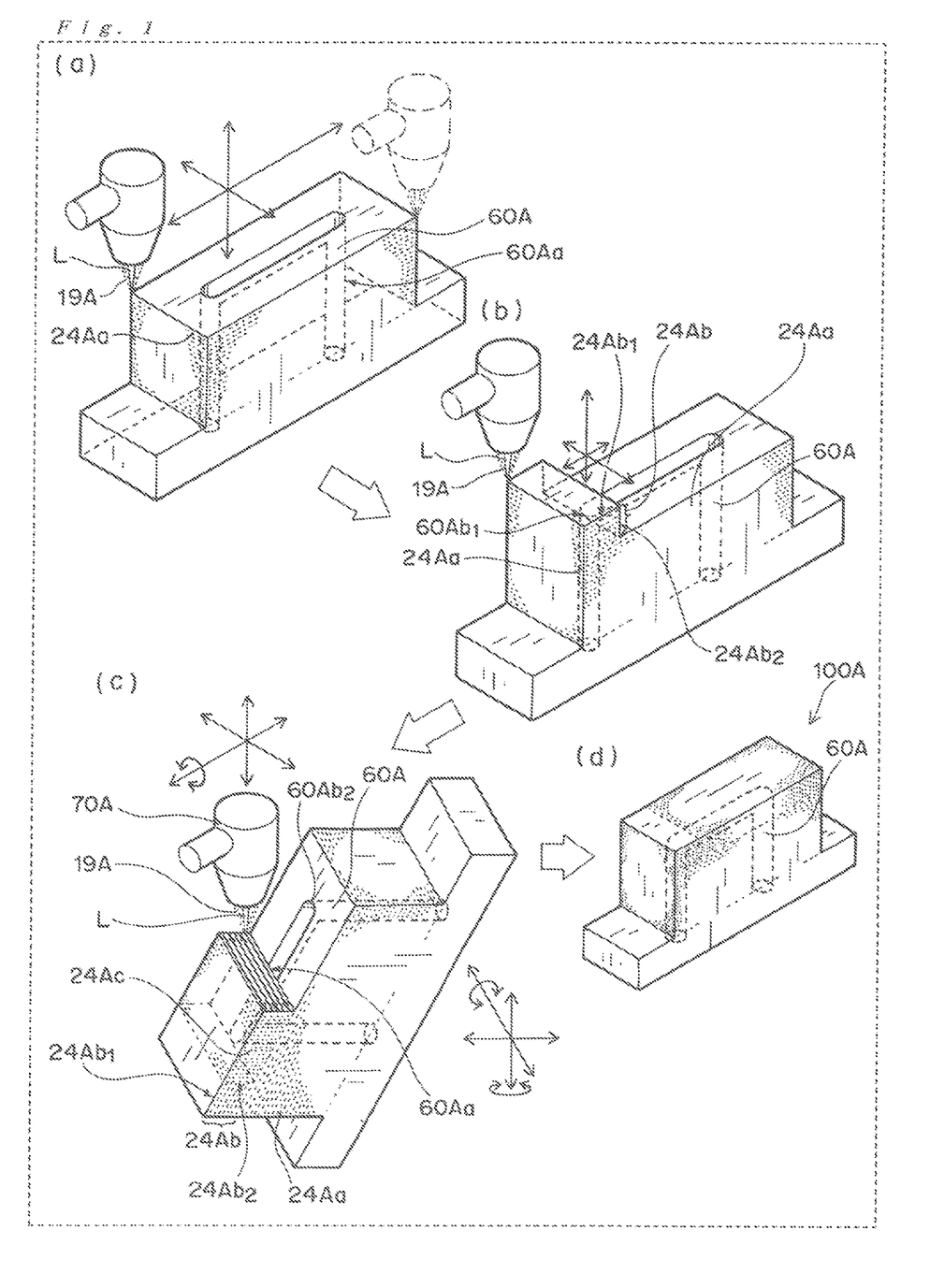
FIG. 1 includes perspective views schematically showing a manufacturing method according to an embodiment of the present invention.
Figure 2:
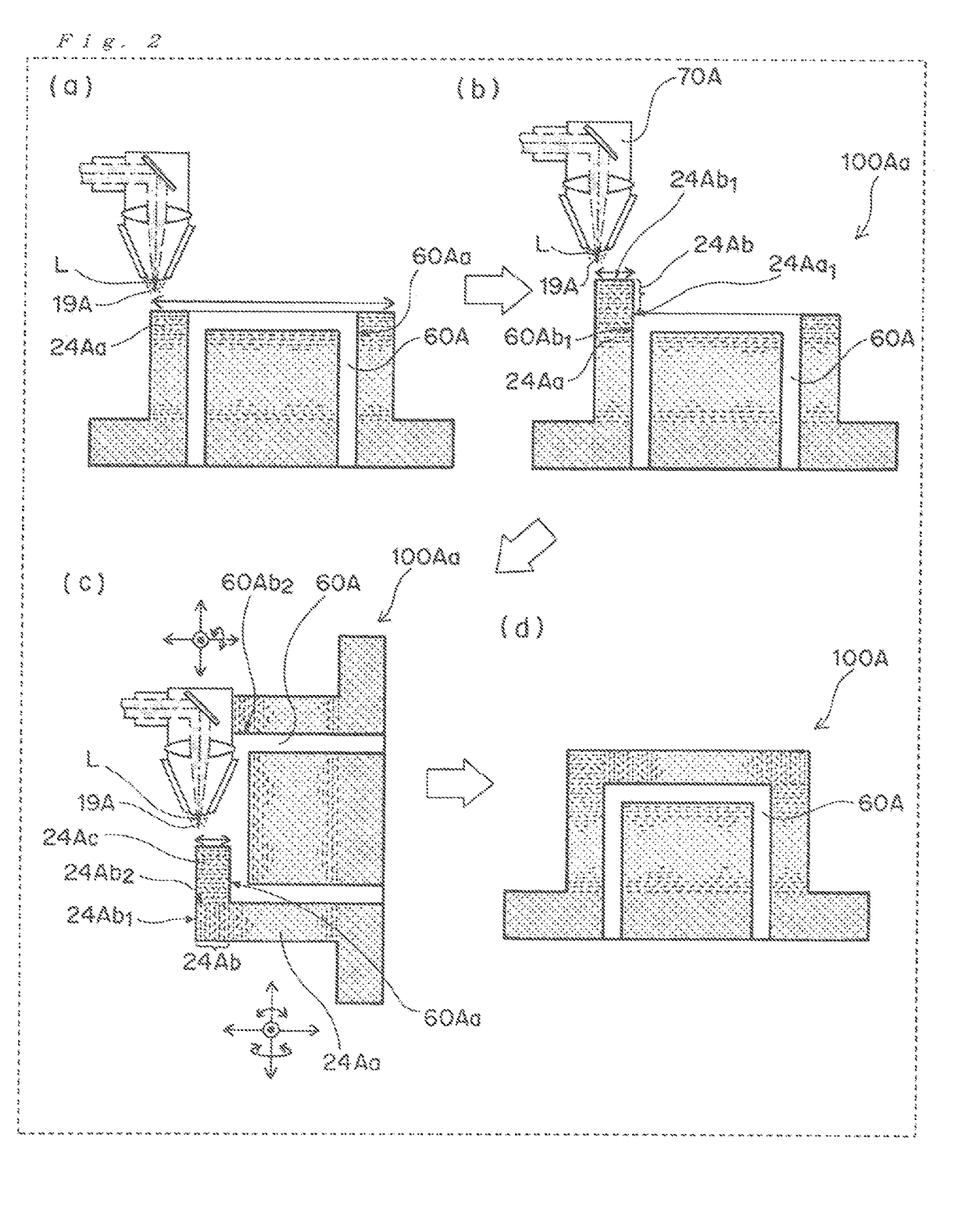
FIG. 2 includes cross-sectional views schematically showing a manufacturing method according to an embodiment of the present invention.

The embodiment of the present invention will be specifically described. First, as shown in FIG. 1(a) and FIG. 2(a), the solidified layer is formed by substantially concurrent performances of a supply of the raw material 19A and an irradiation of a light beam L. More specifically, according to an embodiment of the present invention, a plurality of the solidified layers 24Aa are stacked on each other to provide a part of a wall surface 60Aa which forms the hollow portion 60A.

At a point in time after shaping a part of the wall surface 60Aa which serves to form the hollow portion 60A by the stacked solidified layers 24Aa, the solidified foundation portion 24Ab composed of a plurality of the solidified layers is provided by substantially concurrent performances of a supply of the raw material 19A and an irradiation of the light beam L. It is preferred that the solidified foundation portion 24Ab is located on the solidified layers 24Aa formed prior to the provision of the solidified foundation portion 24Ab, while being not located at the inside of one of opening ends of the hollow portion 60A (i.e., opening end 60Ab$_1$). This is because of an avoidance of the supply of the raw material 19A and the irradiation of the light beam L into the hollow portion 60A. The provision of the solidified foundation portion 24Ab can bring about a stepped portion. Such stepped portion is provided due to a difference in height between the surface 24Aa$_1$ of the uppermost layer of the solidified layers formed prior to the provision of the solidified foundation portion 24Ab and the uppermost surface 24Ab$_1$ of the solidified foundation portion 24Ab (see FIGS. 1(b) and 2(b)).

At a point in time after the solidified foundation portion 24Ab is provided, the orientation of the solidified foundation portion 24Ab is changed as shown in FIGS. 1(b)-(c) and FIGS. 2(b)-(c).

For example, the orientation of the solidified foundation portion 24Ab may be changed such that the lateral side 24Ab$_2$ of the orientation of the solidified foundation portion 24Ab becomes an upper surface thereof (i.e., becomes to face upward). The lateral side in this regard is one at a point in time before the changed orientation of the solidified foundation portion 24Ab. While not intending to limit the present invention, the changed orientation of the solidified foundation portion 24Ab may be performed through a relative change of the position or orientation of a precursor 100Aa of the three-dimensional shaped object, the precursor 100Aa being composed of the solidified foundation portion 24Ab and the solidified layer 24Aa formed prior to the provision of the portion 24Ab. The relative change of the position or orientation of the precursor 100Aa may be preferably performed with respect, to the light beam L. Alternatively, while not intending to limit the present invention, the changed orientation of the solidified foundation portion 24Ab may be performed through a relative change of a supply point of the powder 19A and an irradiation position of the light beam L. The relative change of the supply point of the powder 19A and the irradiation position of the light beam L may be preferably change with respect to the precursor 100Aa. Moreover, the changed orientation of the solidified foundation portion 24Ab can be performed both through the relative change of the position of the precursor 100Aa, and through the relative change of the supply point of the powder 19A and the irradiation position of the light beam L.

At a point in time after the orientation of the solidified foundation, portion 24Ab is changed, the stacking of the subsequent solidified layers 24Ac is initiated on the lateral side 24Ab$_2$ of the solidified foundation portion 24Ab wherein the lateral side 24Ab$_2$ now corresponds to an upper surface of the solidified foundation portion. See FIG. 1(c) and FIG. 2(C). Such stacking of the subsequent solidified layers 24Ac is preferably performed from one of opening ends of the hollow portion 60A (i.e., opening end 60Ab$_1$) to the other thereof (i.e., opening end 60Ab$_2$) to shape the rest of the wall surface 60Aa which forms the hollow portion 60A. From a standpoint of ensuring a preferred structural strength of the three-dimensional shaped object, the stacking of the subsequent solidified layers 24Ac is preferably performed in accordance with the following. For example, the subsequent solidified layers 24Ac are more preferably stacked on each other such that opposed surfaces of the uppermost layer of the already-formed solidified layers 24Aa are covered with the subsequent solidified layers 24Ac, the opposed surfaces being opposed via the hollow portion 60A from one of opening ends of the hollow portion 60A (i.e., opening end 60Ab$_1$) to the other thereof (i.e., opening end 60Ab$_2$).

Throughout the above steps, there can be eventually obtained a three-dimensional shaped object 100A with the hollow portion 60A provided therein (see FIG. 1(d) and FIG. 2(d)).

In the present invention, the changed orientation of the solidified foundation portion 24Ab allows the lateral side 24Ab$_2$ of the solidified foundation portion 24Ab to face upward. Thus, at a point in time after the changed orientation of the solidified foundation portion 24Ab, the subsequent solidified layers 24Ac can be formed on the lateral side 24Ab$_2$ of the solidified foundation portion 24Ab. This makes it possible to shape the rest of the wall surface 60Aa which forms the hollow portion 60A while covering an opened region of the hollow portion 60A with the subsequent solidified layers, which eventually leads to an achievement of a suitable manufacturing of the three-dimensional shaped object 100A with the hollow portion 60A provided in the interior thereof.

In an embodiment of the present invention, the subsequent solidified layer may be formed not only on one of the lateral sides of the solidified foundation portion, but also on the other of the lateral sides of the solidified foundation portion, the one and the other being opposed to each other in the solidified foundation portion. Namely, the forming of the subsequent solidified layers may be performed not only on one lateral side of the solidified foundation portion, but also on the opposite lateral side thereof.

The embodiment described first concerns FIGS. 1 and 2 wherein the forming of the subsequent, solidified layers 24Ac is performed only on one of the lateral sides 24Ab$_2$ of the solidified foundation portion 24Ab after the changed orientation of the solidified foundation portion 24Ab. While on the other hand, the feature of this embodiment concerns FIG. 3 wherein the forming of the subsequent solidified layers is performed not only on one 24Bb$_{21}$ of the lateral sides of the solidified foundation portion 24Bb, but also on the other 24Bb$_{22}$ of the lateral sides of the solidified foundation portion 24Bb after the changed orientation of the solidified foundation portion 24Bb, the one 24Bb$_{21}$ and the other 24Bb$_{22}$ being opposed to each other in the solidified foundation portion 24Bb. The embodiment according to the feature of FIG. 3 allows the subsequent solidified layers to be formed on both lateral sides of the solidified foundation portion 24Bb. When a part of the hollow portion is provided underneath the respective ones of the subsequent solidified layers, the embodiment according to the feature of FIG. 3 makes it possible to shape the rest of the wall surface for the hollow portion while covering an opened region of each hollow portion with the subsequent solidified layers, which eventually leads to an achievement of a suitable manufacturing of the three-dimensional shaped object 100B with the two hollow portions (i.e., the first hollow portion 60BX and the second hollow portion 60BY) provided in the interior thereof. The increased number of the hollow portion in the interior of the three-dimensional shaped object 100B can lead to an achievement of a more suitable passing of a temperature-control medium through each of the hollow portions of the three-dimensional shaped object 100B in a case where the three-dimensional shaped object 100B is used as a metal mold. This can provide a more efficient exchange in heat energy between the temperature-control medium and the three-dimensional shaped object 100B.

Figure 3:
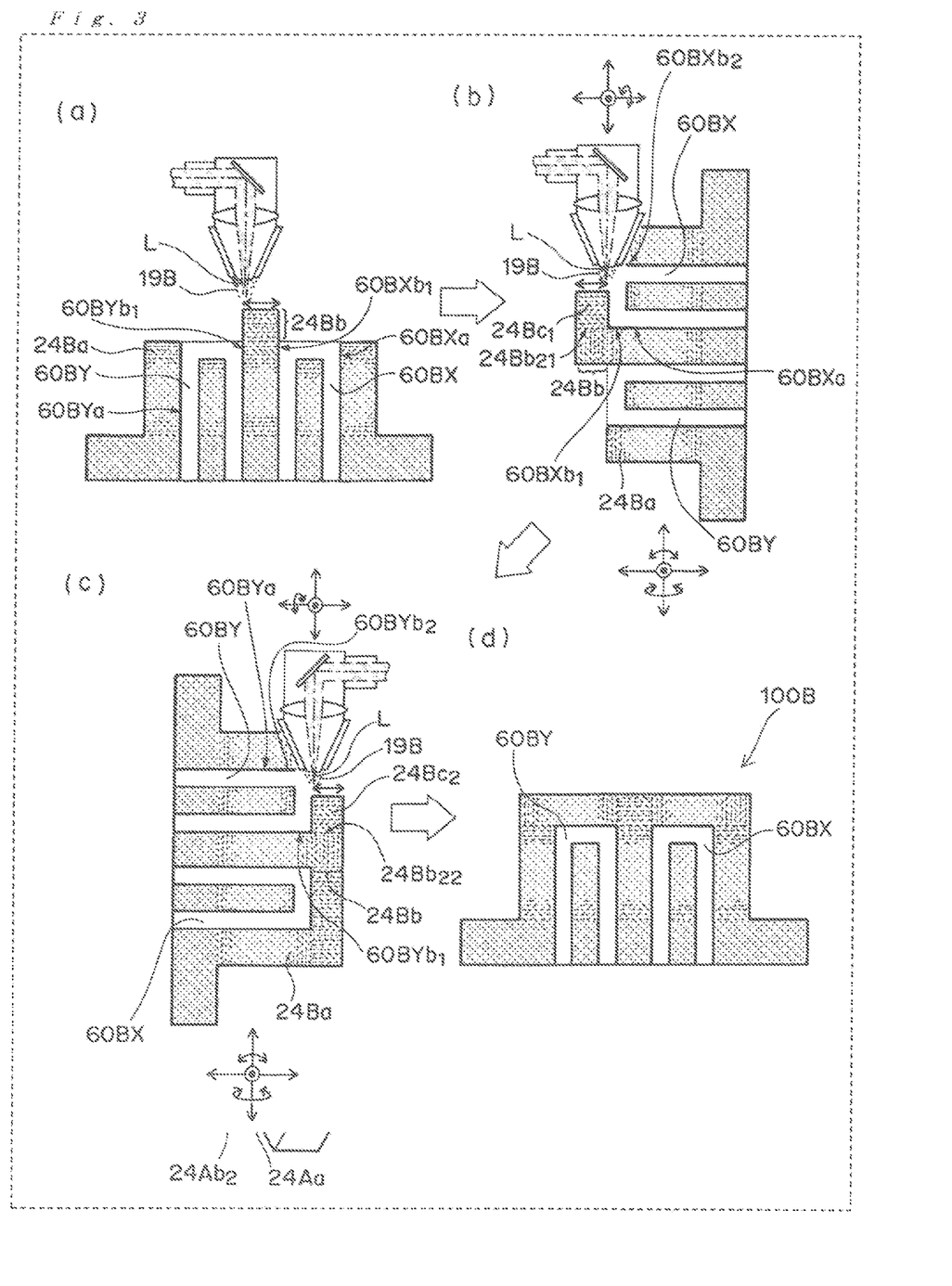
FIG. 3 includes cross-sectional views schematically showing an embodiment wherein a subsequent solidified layer is formed on both sides of a solidified foundation portion.

The detailed explanations will be described with reference to FIGS. 3(a) to 3(d). First, as shown in FIG. 3(a), the supply of the raw material 19B and the irradiation of the light beam L are substantially concurrently performed with each other to form the solidified layer. More specifically, a plurality of the solidified layers 24Ba are stacked on each other through the raw-material supply and the light-beam irradiation to shape a part of a wall surface 60BXa for the first hollow portion 60BX, and also a part of a wall surface 60BYa for the second hollow portion 60BY.

After the stacking of the solidified layers 24Ba, the supply of the raw material 19B and the irradiation of the light beam L are substantially concurrently performed with each other to provide the solidified foundation portion 24Bb composed of a plurality of the solidified layers. It is preferred that the solidified foundation portion 24Bb is located on the solidified layers 24Ba formed prior to the provision of the solidified foundation portion 24Bb, while being not located at the inside of one of opening ends of the first hollow portion 60BX (i.e., opening end $60BXb_1$). This is because of an avoidance of the supply of the raw material 19B and the irradiation of the light beam L into the first hollow portion 60BX. Similarly, the solidified foundation portion 24Bb is preferably located on the solidified layers 24Ba formed prior to the provision of the solidified foundation portion 24Bb, while being not located at the inside of one of opening ends of the second hollow portion 60BY (i.e., opening end $60BYb_1$) because of an avoidance of the supply of the raw material 19B and the irradiation of the light beam L into the second hollow portion 60BY.

After the provision of the solidified foundation portion 24Bb, the orientation of the solidified foundation portion 24Bb is changed as shown in FIG. 3(b). The orientation of the solidified foundation portion 24Bb may be changed such that the first lateral side $24Bb_{21}$ of the solidified foundation portion 24Bb becomes to face upward.

At a point in time after the orientation of the solidified foundation portion 24Bb is changed, the stacking of the subsequent first solidified layers $24Bc_1$ is initiated on the lateral side $24Bb_{21}$ of the solidified foundation portion 24Bb wherein the lateral side $24Bb_{21}$ now corresponds to an upper surface of the solidified foundation portion. Such stacking of the subsequent first, solidified layers $24Bc_1$ is preferably performed at least from one of opening ends of the first hollow portion 60BX (i.e., opening end $60BXb_1$) to the other thereof (i.e., opening end $60BXb_2$) to shape the rest of the wall surface 60BXa for the first hollow portion 60BX. From a standpoint of ensuring a preferred structural strength of the three-dimensional shaped object, the stacking of the subsequent first solidified layers $24Bc_1$ are preferably performed in accordance with the following. For example, the subsequent first solidified layers $24Bc_1$ are more preferably stacked on each other such that opposed surfaces of the uppermost layer of the already-formed solidified layers 24Ba are covered with the subsequent first solidified layers, the opposed surfaces being opposed via the first, hollow portion 60BX from one of opening ends of the first hollow portion 60BX (i.e., opening end $60BXb_1$) to the other thereof (i.e., opening end $60BXb_2$).

After the subsequent first solidified layers $24Bc_1$ are stacked on each other, the orientation of the solidified foundation portion 24Bb is further changed as shown in FIG. 3(c). For example, the orientation of the solidified foundation portion 24Bb may be changed such that the second lateral side $24Bb_{22}$ of the solidified foundation portion 24Bb becomes to face upward. While not intending to limit the present invention, the solidified foundation portion 24Bb may be rotated by about 180 degrees with respect to the state of FIG. 3(b) such that the second lateral side $24Bb_{22}$ of the solidified foundation portion 24Bb becomes to face upward.

At a point in time after the orientation of the solidified foundation portion 24Bb is further changed, the stacking of the subsequent second solidified layers $24Bc_2$ is initiated on the second lateral side $24Bb_{22}$ of the solidified foundation portion 24Bb wherein the second lateral side $24Bb_{22}$ now corresponds to an upper surface of the solidified foundation portion. Such stacking of the subsequent second solidified layers $24Bc_2$ is preferably performed at least from one of opening ends of the second hollow portion 60BY (i.e., opening end $60BYb_1$) to the other thereof (i.e., opening end $60BYb_2$) to shape the rest of the wall surface 60BYa for the second hollow portion 60BY. From a standpoint of ensuring a preferred structural strength of the three-dimensional shaped object, the stacking of the subsequent second solidified layers $24Bc_2$ is preferably performed in accordance with the following. For example, the subsequent second solidified layers $24Bc_2$ are more preferably stacked on each other such that opposed surfaces of the uppermost layer of the already-formed solidified layers 24Ba are covered with the subsequent second solidified layers, the opposed surfaces being opposed via the second hollow portion 60BY from one of opening ends of the second hollow portion 60BY (i.e., opening end $60BYb_1$) to the other thereof (i.e., opening end $60BYb_2$).

Throughout the above steps, there can be eventually obtained a three-dimensional shaped object 100B with the two hollow portions, i.e., the first hollow portion 60BX and the second hollow portion 60BY provided therein (see FIG. 3(d)).

According to an embodiment of the present invention, a rotatable base part is used. The manufacturing of the three-dimensional shaped object with the solidified foundation portion, included therein may be performed on both principal surfaces of the rotatable base part through a rotation of the base part.

Figure 4:
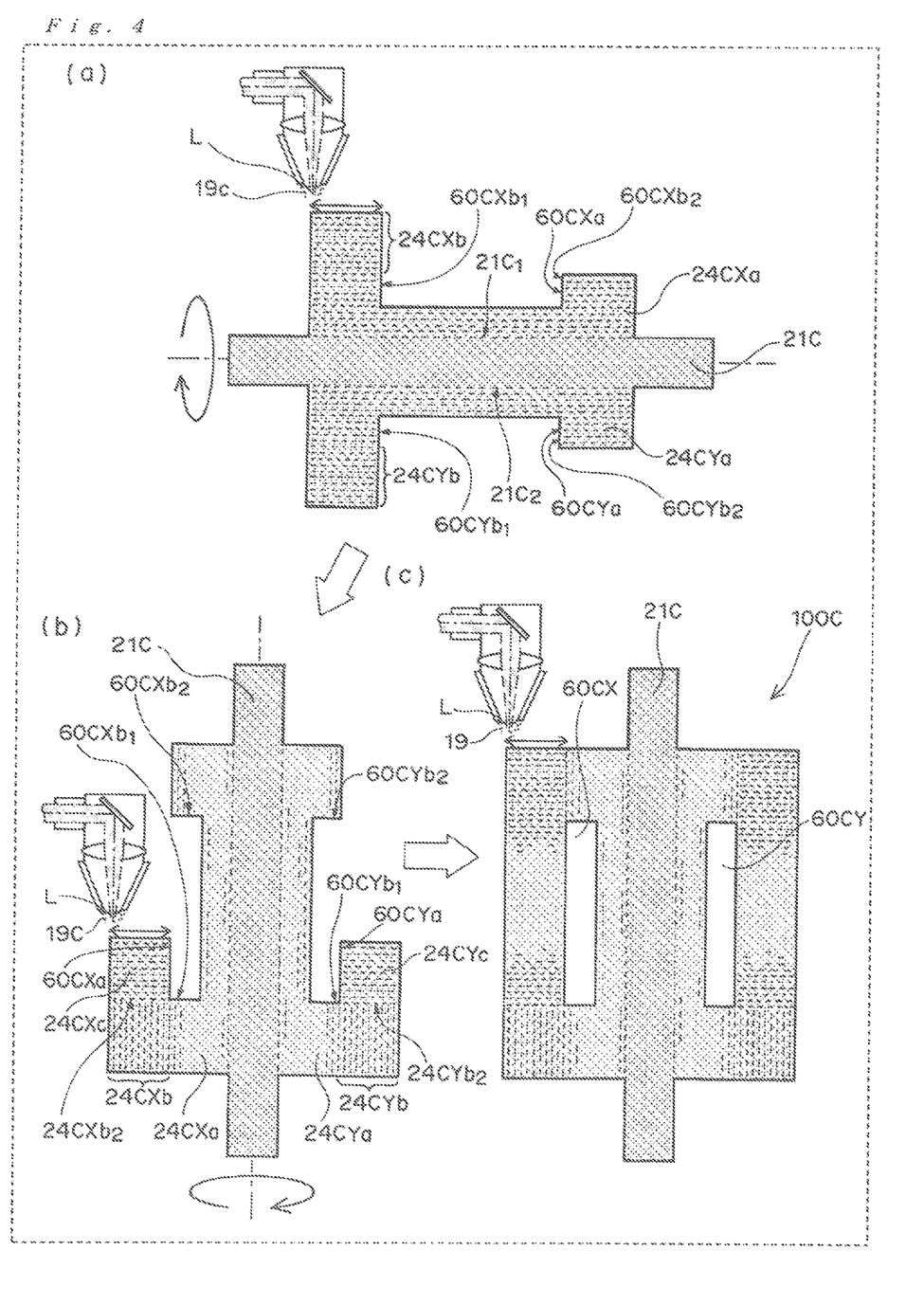
FIG. 4 includes cross-sectional views schematically showing an embodiment wherein a three-dimensional shaped object including a solidified foundation portion is manufactured on both principal surfaces of a base part.

This embodiment is featured by the use of the rotatable base part as a base part 21C for the formation of the solidified layer through the substantially concurrent performances of the supply of the raw material 19C and the irradiation of the light beam L. The rotatability of the base part 21C enables each of one principal surface $21C_1$ and the other principal surface $21C_2$ of the base part 21C to face upward, serving for the formation of the solidified layer in the substantially concurrent performances of the supply of the raw material 19C and the irradiation of the light beam L.

First, as shown in FIG. 4(a), the supply of the raw material 19C and the irradiation of the light beam L are substantially concurrently performed with respect to the first principal surface $21C_1$ of the base part 21C, and thereby the solidified layer is formed. Specifically, such formation of the solidified layer is performed to provide a stacking of the solidified layers 24CXa, and thereby shaping a part of a wall surface 60CXa which forms the first hollow portion 60CX of the two hollow portions (i.e., the first hollow portion 60CX and the second hollow portion 60CY). Thereafter, the solidified foundation portion 24CXb composed of the plurality of the solidified layers is provided by the substantially concurrent performances of the supply of the raw material 19C and the irradiation of the light beam L. It is preferred that the solidified foundation portion 24CXb is located on the solidified layers 24CXa formed prior to the provision of the solidified foundation portion 24CXb, while being not located at the inside of one of opening ends of the first hollow portion 60CX (i.e., opening end $60CXb_1$). This is because of an avoidance of the supply of the raw material 19C and the irradiation of the light beam L into the first hollow portion 60CX.

After the stacking of the solidified layer 24CXa, the base part 21C is rotated such that the second principal surface $21C_2$ becomes to face upward, the second principal surface $21C_2$ being opposed to the first principal surface $21C_1$ in the base part 21C. Thereafter, the supply of the raw material 19C and the irradiation of the light beam L are substantially concurrently performed with respect to the second principal surface $21C_2$ of the base part 21C to form the solidified layer. Specifically, such formation of the solidified layer is performed to provide a stacking of the solidified layers 24CYa, and thereby shaping a part of a wall surface 60CYa which forms the second hollow portion 60CY of the two hollow portions (i.e., the first hollow portion 60CX and the second hollow portion 60CY). Thereafter, the solidified foundation portion 24CYb composed of the plurality of the solidified layers is provided by the substantially concurrent performances of the supply of the raw material 19C and the irradiation of the light beam L. It is preferred that the solidified foundation portion 24CYb is located on the solidified layers 24CYa formed prior to the provision of the solidified foundation portion 24CYb, while being not located at the inside of one of opening ends of the second hollow portion 60CY (i.e., one end 60CYb$_1$). This is because of an avoidance of the supply of the raw material 19C and the irradiation of the light beam L into the second hollow portion 60CY.

After the provision of the solidified foundation portions 24CXb and 24CYb, the orientations of the solidified foundation portions 24CXb and 24CYb are changed as shown in FIG. 4(b). For example, the orientation of the solidified foundation portion 24CXb may be changed such that the lateral side 24CXb$_2$ of the solidified foundation portion 24CXb becomes to face upward. Similarly, the orientation of the solidified foundation portion 24CYb may be changed such that the lateral side 24CYb$_2$ of the solidified foundation portion 24CYb becomes to face upward.

At a point in time after the orientations of the solidified foundation portions 24CXb and 24CYb are changed, the stacking of the subsequent first solidified layers 24CXc is initiated on the lateral side 24CXb$_2$ of the solidified foundation portion 24CXb wherein the lateral side 24CXb$_2$ now corresponds to an upper surface of the solidified foundation portion. Such stacking of the subsequent first solidified layers 24CXc is preferably performed at least from one of opening ends of the first hollow portion 60CX (i.e., opening end 60CXb$_1$) to the other thereof (i.e., opening end 60CXb$_2$) to shape the rest of the wall surface 60CXa for the first hollow portion 60CX. From a standpoint of ensuring a preferred structural strength of the three-dimensional shaped object, the stacking of the subsequent first solidified layers 24CXc is preferably performed in accordance with the following. More specifically, the subsequent first solidified layers 24CXc are more preferably stacked on each other such that opposed surfaces of the uppermost layer of the already-formed solidified layers 24CXa are covered with the subsequent first solidified layers, the opposed surfaces being opposed via the first hollow portion 60CX from one of opening ends of the first hollow portion 60CX (i.e., opening end 60CXb$_1$) to the other thereof (i.e., opening end 60CXb$_2$). Similarly, at a point in time after the orientations of the solidified foundation portions 24CXb and 24CYb are changed, the stacking of the subsequent second solidified layers 24CYc is initiated on the lateral side 24CYb$_2$ of the solidified foundation portion 24CYb wherein the lateral side 24CYb$_2$ now corresponds to an upper surface of the solidified foundation portion. Such stacking of the subsequent second solidified layers 24CYc is preferably performed at least from one of opening ends of the second hollow portion 60CY (i.e., opening end 60CYb$_1$) to the other thereof (i.e., opening end 60CYb$_2$) to shape the rest of the wall surface 60CYa for the second hollow portion 60CY. From a standpoint of ensuring a preferred structural strength of the three-dimensional shaped object, the stacking of the subsequent second solidified layers 24CYc is preferably performed in accordance with the following. More specifically, the subsequent second solidified layers 24CYc are more preferably stacked on each other such that opposed surfaces of the uppermost layer of the already-formed solidified layers 24CYa are covered with the subsequent second solidified layers, the opposed surfaces being opposed via the second hollow portion 60CY from one of opening ends of the second hollow portion 60CY (i.e., opening end 60CYb$_1$) to the other thereof (i.e., opening end 60CYb$_2$).

Throughout the above steps, there can be eventually obtained a three-dimensional shaped object 100C with the first hollow portion 60CX and the second hollow portion 60CY provided at the respective sides of the one principal surface 21C$_1$ and the other principal surface 21C$_2$ of the base part 21C (see FIG. 4(c)).

According to an embodiment of the present invention, a plurality of the solidified foundation portions may be provided, in which case the subsequent solidified layer may be formed by using each of the plurality of the solidified foundation portions as the platform for the formation of the subsequent solidified layer.

Figure 5:
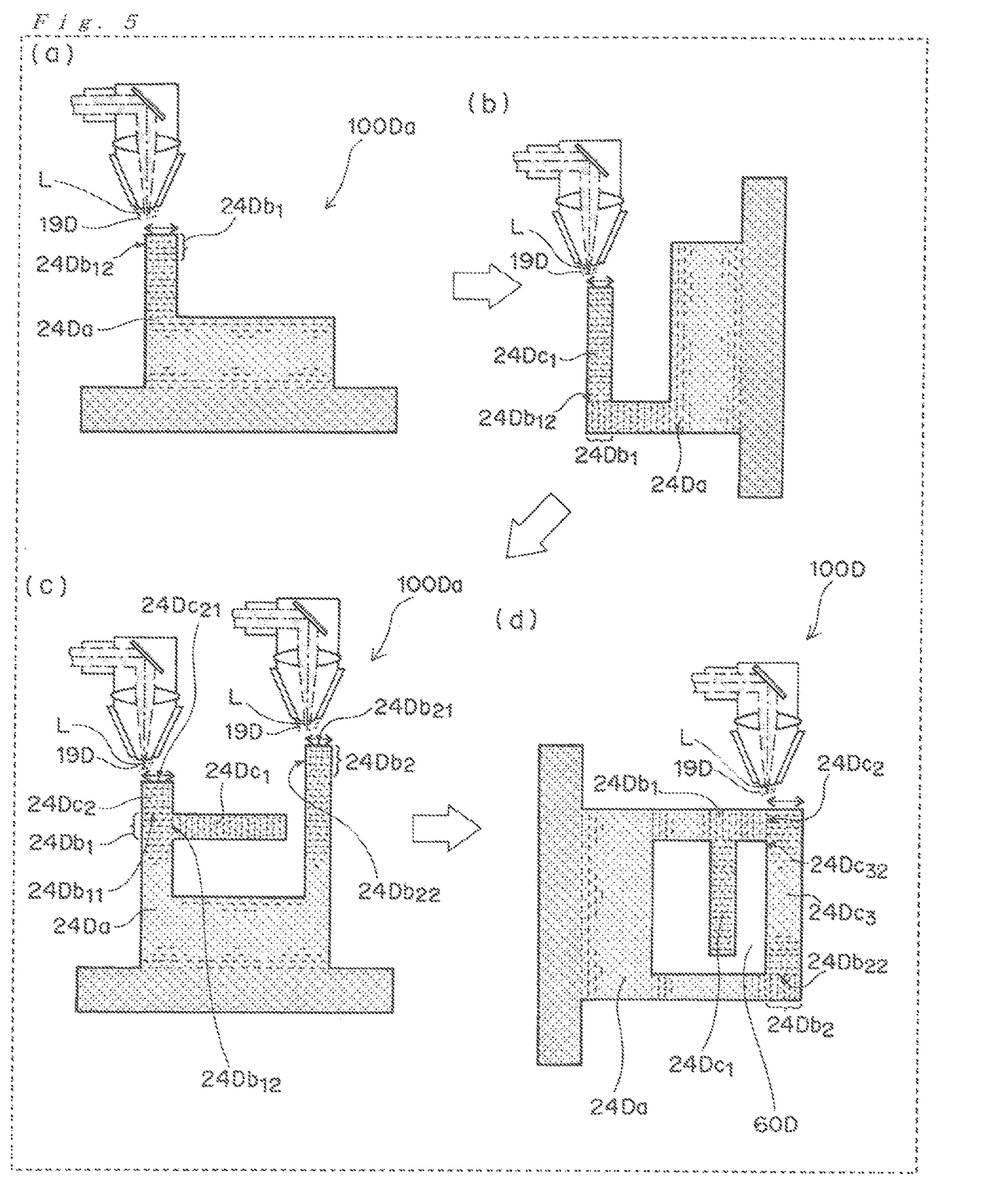
FIG. 5 includes cross-sectional views schematically showing an embodiment wherein a subsequent solidified layer is formed by using each of solidified foundation portions as a platform.

This embodiment is featured by a formation of the plurality of the solidified foundation portions upon the manufacturing of the three-dimensional shaped object 100D with its hollow portion included therein (see FIG. 5). Specifically, the plurality of the solidified foundation portions each serve as a platform for supporting the subsequent solidified layers to be formed. The more specific feature of this embodiment is that a plurality of the solidified foundation portions 24Db$_1$, 24Db$_2$ are formed, and thereafter the orientation of the solidified foundation portions 24Db$_1$, 24Db$_2$ are changed, and then a plurality of the subsequent solidified layers 24Dc$_1$, 24Dc$_2$, 24Dc$_3$ are formed by using each of the solidified foundation portions 24Db$_1$, 24Db$_2$ as the platform. In other words, the subsequent solidified layers 24Dc$_1$, 24Dc$_2$, 24Dc$_3$ are formed to be in direct contact with the orientation-changed solidified foundation portions 24Db$_1$, 24Db$_2$. In this regard, the subsequent solidified layers are located adjacent to the solidified foundation portions, and thus each configuration of the subsequent solidified layers relatively largely depends on each configuration of the solidified foundation portions. Thus, in a case of the plurality of the solidified foundation portions to be provided, a suitable controlled location of the solidified foundation portions can lead to a suitable controlled location of the subsequent solidified layers. In addition to this, a suitable controlled number of the stacked layers for each of the subsequent solidified layers makes it possible to provide a hollow portion 60D having a more complex shape as compared to that of FIGS. 1 and 2 wherein the subsequent solidified layers 24Dc are stacked on a single solidified foundation portion 24Db.

The embodiment of the present invention will be specifically described. First, as shown in FIG. 5(a), the supply of the raw material 19D and the irradiation of the light beam L are substantially concurrently performed to stack the solidified layers 24Da on the base part such that the stacked solidified layers 24Da have an approximately "L" form in a cross-sectional view. Thereafter, the solidified foundation portion 24Db$_1$ is formed on the stacked solidified layers 24Da such that the solidified foundation portion 24Db$_1$ are composed of stacked solidified layers.

After the provision of the solidified foundation portion 24Db$_1$, the orientation of the solidified foundation portion 24Db$_1$ is changed. For example, the orientation of the solidified foundation portion 24Db$_1$ may be changed such that the lateral side 24Db$_{12}$ of the solidified foundation portion 24Db$_1$ becomes to face upward as shown in FIG. 5(b). While not intending to limit the present invention, the changed orientation of the solidified foundation portion $24Db_1$ may be performed through a relative change of the position or orientation of a precursor 100Da of the three-dimensional shaped, object, the precursor 100Da being composed of the solidified foundation portion $24Db_1$ and the solidified layer 24Da formed prior to the provision of the portion $24Db_1$. Alternatively, while not intending to limit the present invention, the changed orientation of the solidified foundation portion $24Db_1$ may be performed through a relative change of a supply point of the powder 19D and an irradiation position of the light beam L. Moreover, the changed orientation of the solidified foundation portion $24Db_1$ can be performed both through the relative change of the position of the precursor 100Da, and through the relative change of the supply point of the powder 19D and the irradiation position of the light beam L.

At a point in time after the orientation of the solidified foundation portion $24Db_1$ is changed, the subsequent solidified layers $24Dc_1$ are stacked upward on the lateral side $24Db_{12}$ of the solidified foundation portion $24Db_1$ wherein the lateral side $24Db_{12}$ now corresponds to an upper surface of the solidified foundation portion. See FIG. 5(b).

After the stacking of the solidified foundation portion $24Dc_1$, the orientation of the solidified foundation portion $24Db_1$ is changed. For example, the solidified foundation portion $24Db_1$ may be changed from the orientation of FIG. 5(b) to that of FIG. 5(c). That is, the orientation wherein the lateral side $24Db_{12}$ of the solidified foundation portion $24Db_1$ faces upward in FIG. 5(b) may be changed to another orientation wherein the lateral side $24Db_{12}$ of the solidified foundation portion $24Db_1$ faces rightward in FIG. 5(c).

At a point in time after the orientation of the solidified foundation portion $24Db_1$ is changed, the subsequent solidified layers $24Dc_2$ are stacked upward on the upper surface $24Db_{11}$ of the solidified foundation portion $24Db_1$ (see FIG. 5(c)). Moreover, as shown in FIG. 5(c), the supply of the raw material 19D and the irradiation of the light beam L are substantially concurrently performed to further stack the new solidified layers 24Da on the already-formed solidified layers 24Da such that they have an approximately reversed "L" form in a cross-sectional view. The solidified layers 24Da in the form of the approximately reversed "L" may be provided to be spaced away from the subsequent solidified layers $24Dc_1$ formed on the lateral side $24Db_{12}$ of the solidified foundation portion $24Db_1$. Subsequent to the provision of the solidified layers 24Da, the solidified foundation portion $24Db_2$ is formed on the stacked solidified layers 24Da such that the solidified foundation portion $24Db_2$ are composed of stacked solidified layers. As shown in the cross-sectional view of FIG. 5(c), the solidified foundation portion $24Db_2$ may be provided such that the level of the upper surface $24Db_{21}$ of the solidified foundation portion $24Db_2$ is higher than the level of the upper surface $24Dc_{21}$ of the opposed "L"-formed solidified layers $24Dc_2$.

After the provision of the solidified foundation portion $24Db_2$, the orientation of the solidified foundation portion $24Db_2$ is changed. For example, the orientation of the solidified foundation portion $24Db_2$ may be changed such that, the lateral side $24Db_{22}$ of the solidified foundation portion $24Db_2$ becomes to face upward as shown in FIG. 5(d). While not intending to limit the present invention, the changed orientation of the solidified foundation portion $24Db_2$ may be performed through a relative change of the position or orientation of a precursor 100Da of the three-dimensional shaped object, the precursor 100Da being one at the time of the provision of the portion $24Db_2$. Alternatively, while not intending to limit the present invention, the changed orientation of the solidified foundation portion $24Db_2$ may be performed through a relative change of a supply point of the powder 19D and an irradiation position of the light beam L. Moreover, the changed orientation of the solidified foundation portion $24Db_2$ can be performed both through the relative change of the position of the precursor 100Da, and through the relative change of the supply point of the powder 19D and the irradiation position of the light beam L.

At a point in time after the orientation of the solidified foundation portion $24Db_2$ is changed, the subsequent solidified layers $24Dc_3$ are stacked upward on the lateral side $24Db_{22}$ of the solidified foundation portion $24Db_2$ wherein the lateral side $24Db_{22}$ now corresponds to an upper surface of the solidified foundation portion (see FIG. 5(a)). As shown in FIG. 5(d), the subsequent solidified layers $24Dc_3$ may be configured such that its lateral side $24Dc_{32}$ is in contact with the upper surface $24Dc_{21}$ of the "L"-formed solidified layers $24Dc_2$.

Throughout the above steps, there can be eventually obtained a three-dimensional shaped object 100D with a complex hollow portion 60D provided therein (see FIG. 5(d)).

In the above embodiment taken as an example, the solidified foundation portions $24Db_1$, $24Db_2$ are formed, and thereafter the orientation of the solidified foundation portions $24Db_1$, $24Db_2$ are changed, and thereafter the subsequent solidified layers $24Dc_1$, $24Dc_2$, $24Dc_3$ are formed by using the solidified foundation portions $24Db_1$, $24Db_2$ as the platform. This means that the subsequent solidified layers $24Dc_1$, $24Dc_1$, $24Dc_3$ are formed to be in direct contact with each of the orientation-changed solidified foundation portions $24Db_1$, $24Db_2$. In this way, a suitable controlled location of the solidified foundation portions can result in a suitable controlled location of the subsequent solidified layers. In addition to this, a suitable controlled number of the stacked layers for each of the subsequent solidified layers makes it possible to provide the hollow portion 60D having the complex shape as shown in FIG. 5(d) for example. In a case where the three-dimensional shaped object is used as a metal mold, the complex configuration of the hollow portion 60D allows a more efficient exchange in heat energy to be achieved between the three-dimensional shaped object 100D and the temperature-control medium passing through the hollow portion of the shaped object.

According to an embodiment of the present invention, the subsequent solidified layer having an inclined surface (sloping surface) may be formed on the solidified foundation portion.

Figure 6:
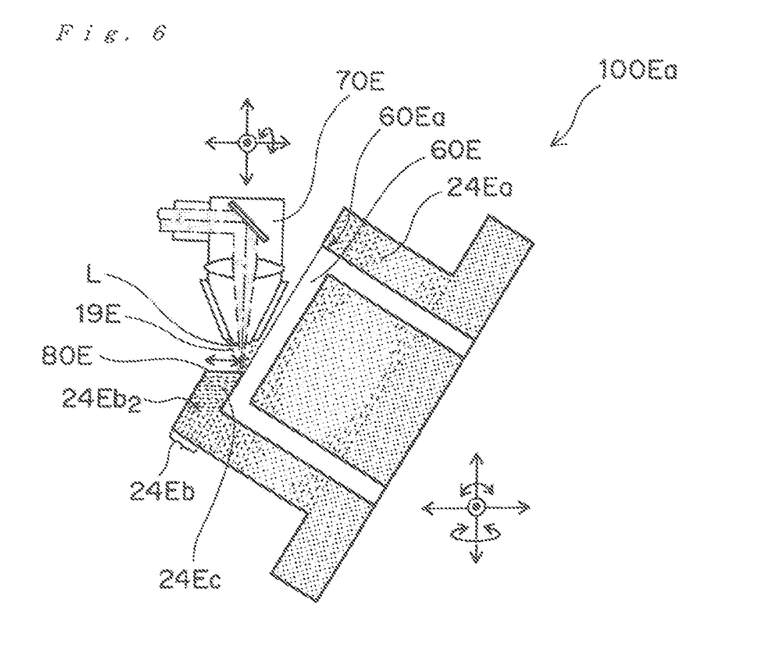
FIG. 6 is a cross-sectional view schematically showing another embodiment of forming a subsequent solidified layer on a solidified foundation portion

This embodiment is featured by the inclined surface of the subsequent solidified layer to be formed on the solidified foundation portion. For example in an embodiment of FIG. 2(c), at a point, in time after the orientation of the solidified foundation portion 24Ab is changed, the stacking of the subsequent solidified layers 24Ac is performed on the lateral side $24Ab_2$ of the solidified foundation portion 24Ab wherein the lateral side $24Ab_2$ corresponds to an upper surface of the solidified foundation portion. In a case where the subsequent solidified layers 24Ac formed on the lateral side $24Ab_2$ of the solidified foundation portion 24Ab has a relatively small thickness, the following may occur. Specifically, at least a part of a head 70A for concurrently performing the supply of raw material 19A and irradiation with the light L can be brought into contact with the surface of the uppermost layer of the already-formed solidified layers 24Aa, which can inhibit a suitable stacking of the subsequent solidified layers 24Ac along the stacking direction. For this reason, as shown in the cross-sectional view of FIG. 6, it is preferable to relatively tilt the position or orientation of a precursor 100Ea of the three-dimensional shaped object, the precursor 100Ea being composed of the solidified foundation portion 24Eb and the solidified layers 24Ea formed prior to the provision of the portion 24Eb. More specifically, the precursor 100Ea of the three-dimensional shaped object may be tilted such that the stacking; direction of the subsequent solidified layers forms an angle with respect to the vertical direction. Such tilting can prevent the head 70E for the supply of raw material 19E and the irradiation with the light L in a vertical downward direction from making contact with the precursor 100Ea of the three-dimensional shaped object. As shown in FIG. 6, the head 70E can be prevented from making contact with the surface of the uppermost layer of the solidified layers 24Ea. The present invention is not limited to that. In order for the head 70E to be prevented from making contact with the surface of the uppermost layer of the solidified layers 24Ea, the head 70E may be tilted such that the supplying direction of the raw material 19E and the irradiation direction of the light beam L become oblique. Moreover, for the purpose of an avoidance of the contact between the head 70E and the precursor 100Ea of the three-dimensional shaped object, the head 70E and the precursor 100Ea can be suitably positioned. Specifically, the head 70E may be positioned such that the supplying direction of the raw material 19E and the irradiation direction of the light beam L are oblique, and also the position of the precursor 100Ea of the three-dimensional shaped object may be tilted in the cross-sectional view.

According to this embodiment, the tilting can avoid the direct contact of the head 70E with the precursor 100Ea of the three-dimensional shaped object, more specifically the surface of the uppermost layer of the solidified layers 24Ea. This makes it possible to form, on the lateral side $24Eb_2$ of the solidified foundation portion 24Eb, the subsequent solidified layers 24Ec having the inclined surface 80E. More specifically, such subsequent solidified layers 24Ea can be suitably formed by the relatively tilting of the position of the precursor 100Ea of the three-dimensional shaped object, and/or the tilting of the head 70E, and thereby the oblique supplying direction of the raw material 19E and the irradiation direction of the light beam L (preferably by the "oblique" condition forming an angle with respect to the stacking direction of the subsequent solidified layers). This leads to an achievement of suitably forming the rest of the wall surface 60Ea for the hollow portion 60E wherein an opened region of the hollow space is covered. As a result, the three-dimensional shaped object having the hollow portion 60E in the interior thereof can be more suitably manufactured.

In an embodiment of the present invention, a metal having a relatively high thermal conduction may be used as a raw material for the wall surface 60Aa which forms the hollow portion 60A (see FIG. 1 and FIG. 2). For example, a copper and/or an aluminum can be used as such raw material.

In a case where the three-dimensional shaped object having a hollow portion in the interior thereof is used as a metal mold, the hollow portion can be used as a temperature-control medium passage for passing a temperature-control medium therethrough. In this case, a copper and/or an aluminum may be used as a raw material for the wall surface 60Aa which forms the hollow portion 60A, for example from a standpoint of an efficient and effective transfer of heat between a cavity-forming surface and a temperature-control medium. On the other hand, while not intending to limit the present invention, the solidified foundation portion 24Ab and the subsequent solidified layers 24Ac formed thereon (see the cross-sectional view of FIG. 1 and FIG. 2) can be used as the cavity-forming surface in a case where the three-dimensional shaped object having the hollow portion in the interior thereof is used as the metal mold. The cavity-forming surface can be a surface to which a molding press is more likely to be applied. Thus, the cavity-forming surface is required to have a relatively high structural strength. To this end, an iron, a stainless steel and/or the like, which has/have a relatively high stiffness, may be used as the raw material for the formation of the solidified foundation portion 24Ab and the subsequent solidified layers 24Ac provided thereon.

Although some embodiments of the present invention have been hereinbefore described, these are regarded merely as typical ones, and thus the present invention is not limited to such embodiments. It will be readily appreciated by those skilled in the art that various modified embodiments are possible without departing from the spirit of the scope of the present invention.

For example in the LMD process, both of the powder and the welding material may be used as a raw material for manufacturing the three-dimensional shaped object. In this case, the powder may be used for a certain portion of the three-dimensional shaped object to be manufactured, and also the welding material may be used for the other portion of the three-dimensional shaped object to be manufactured.

It should be noted that the present invention as described above includes the following suitable aspects:

The first aspect: A method for manufacturing a three-dimensional shaped object by a continuous formation of a plurality of solidified layers through a light beam irradiation, the three-dimensional shaped object being provided with a hollow portion in an interior of the shaped object.

wherein the solidified layer is formed by irradiating a raw material with a light beam, at the time of suppling the raw material, thereby allowing a sintering of the raw material or a melting and subsequent solidification of the raw material; wherein a solidified foundation portion is provided as a part of the three-dimensional shaped object, the solidified foundation portion being used for a platform for a formation of a subsequent layer provided as the solidified layer, and wherein an orientation of the solidified foundation portion is changed prior to the formation of the subsequent solidified layer.

The second aspect: The method according to the first aspect, wherein the orientation of the solidified foundation portion is changed such that the subsequent solidified layer is stacked on a lateral side of the solidified foundation portion.

The third aspect: The method according to the first or second aspect, wherein, after a part of a wall surface which forms the hollow portion is shaped, the orientation of the solidified foundation portion is changed.

The fourth aspect: The method according to the third aspect, wherein, after the orientation of the solidified foundation portion is changed, the subsequent solidified layer is formed such that the rest of the wall surface which forms the hollow portion is shaped.

The fifth aspect: The method according to any one of the second to fourth aspects, wherein the subsequent solidified layer is formed not only on one of the lateral sides of the solidified foundation portion, but also on the other of the lateral sides of the solidified foundation portion, the one and the other being opposed to each other in the solidified foundation portion.

The sixth aspect: The method according to any one of the first to fifth aspect, wherein a rotatable base part is used, and wherein the manufacturing of the three-dimensional shaped object with its solidified foundation portion included is performed on both principal surfaces of the rotatable base part through a rotation of the base part.

The seventh aspect: The method according to any one of the first to sixth aspect, comprising forming a plurality of the solidified foundation portions, and the subsequent solidified layer is formed by using each of the plurality of the solidified foundation portions as the platform.

The eighth aspect: The method according to any one of the first to seventh aspect, wherein a powder and/or a welding material is used as the raw material.

INDUSTRIAL APPLICABILITY

The manufacturing method according to the present invention can provide various kinds of articles. For example, in a case where a three-dimensional shaped object obtained by the present invention is made of a metal material, the three-dimensional shaped object can be used as a metal mold for a plastic injection molding, a press molding, a die casting, a casting or a forging. While on the other hand in a case where the three-dimensional shaped object obtained by the present invention is made of a resin material, the three-dimensional shaped object can be used as a resin molded article.

CROSS REFERENCE TO RELATED PATENT APPLICATION

The present application claims the right, of priority of Japanese Patent Application No. 2016-230305 (filed on Nov. 28, 2016, the title of the invention: "METHOD FOR MANUFACTURING THREE-DIMENSIONAL SHAPED OBJECT"), the disclosure of which is incorporated herein by reference.

EXPLANATION OF REFERENCE NUMERALS

L . . . Light beam
19A, 19B, 19C, 19D, 19E . . . Raw material
21C . . . Base part
21C$_1$ . . . Principal surface of base part
21C$_2$ . . . Principal surface of base part
24Aa, 24Ac, 24Ba, 24Bc$_1$, 24Bc$_2$, 24CXa, 24CYa, 24CXc, 24CYc, 24Da, 24Dc$_1$, 24Dc$_2$, 24Dc$_3$, 24Ea, 24Ec . . . Solidified layer
24Ab, 24Bb, 24CXb, 24CYb, 24Db$_1$, 24Db$_2$, 24Eb . . . Solidified foundation portion
24Ab$_2$, 24Bb$_{21}$, 24Bb$_{22}$, 24CXb$_2$, 24CYb$_2$, 24Db$_{12}$, 24Db$_{22}$, 24Eb$_2$ . . . Lateral side of solidified foundation portion
24Bb$_{21}$ . . . One of lateral sides of solidified foundation portion
24Bb$_{22}$ . . . The other of lateral sides of solidified foundation portion
24Ac, 24Bc$_1$, 24Bc$_2$, 24CXc, 24CYc, 24D$_{C1}$, 24D$_{C2}$, 24D$_{C3}$, 24Ec . . . Subsequent solidified layer
60A, 60BX, 60BY, 60CX, 60CY, 60D, 60E . . . Hollow portion
60Aa, 60BXa, 60BYa, 60CXa, 60CYa, 60Ea . . . Wall surface for hollow portion
100A, 100B, 100C, 100D . . . Three-dimensional shaped object

The invention claimed is:

1. A Laser Metal Deposition (LIVID) method for manufacturing a three-dimensional shaped object by a continuous formation of a plurality of solidified layers through a light beam irradiation, the three-dimensional shaped object being provided with a hollow portion in an interior, wherein the plurality of solidified is layers are formed by concurrently supplying a raw material and irradiating the raw material with a light beam on a rotatable base part, thereby allowing a sintering of the raw material or a melting and subsequent solidification of the raw material, wherein a solidified foundation portion is provided as a part of the three-dimensional shaped object, the solidified foundation portion being used for a platform for a formation of a later solidified layer, among the plurality of solidified layers, wherein an orientation of the solidified foundation portion is changed prior to the formation of the later solidified layer, wherein a powder and/or a welding material is used as the raw material, wherein the solidified foundation portion is provided on an earlier solidified layer, among the plurality of solidified layers, formed prior to the formation of the solidified foundation portion such that a stepped portion is provided due to a difference in height between a surface of an uppermost layer of the earlier solidified layer, among the plurality of solidified layers, formed prior to the solidified foundation portion, and an uppermost surface of the solidified foundation portion, and wherein the rotatable base part is used such that the irradiation of the three-dimensional shaped object, with the solidified foundation portion included therein, is on at least two principal surfaces of the rotatable base part through a rotation of the rotatable base part, wherein a part of a wall surface which forms the hollow portion is shaped, and then after the orientation of the solidified foundation portion is changed, the later solidified layer is formed such that the rest of the wall surface which forms the hollow portion is shaped.

2. The method according to claim 1, wherein the orientation of the solidified foundation portion is changed such that the later solidified layer is stacked on one lateral side of the solidified foundation portion.

3. The method according to claim 2, wherein the subsequent later solidified layer is also formed on another lateral side of the solidified foundation portion, the one lateral side and the another lateral side being opposed to each other in the solidified foundation portion.

4. The method according to claim 1, comprising forming a plurality of the solidified foundation portions, and the later solidified layer is formed by using each of the plurality of the solidified foundation portions as the platform.

* * * * *